United States Patent [19]
Alexander

[11] Patent Number: 5,997,074
[45] Date of Patent: Dec. 7, 1999

[54] SLIDEOUT ROOM OPERATING SYSTEM

[76] Inventor: Jesse Alexander, 8750 Pendleton Pike, Indianapolis, Ind. 46226

[21] Appl. No.: 09/084,548

[22] Filed: May 26, 1998

[51] Int. Cl.⁶ ....................................................... B60P 3/39
[52] U.S. Cl. .............................. 296/176; 296/172; 52/67; 74/89.21
[58] Field of Search ............................ 296/26.08, 26.09, 296/26.12, 26.13, 165, 170, 171, 172, 175, 176; 74/89.21; 52/67, 143

[56] References Cited

U.S. PATENT DOCUMENTS

| 5,332,276 | 7/1994 | Blodgett, Jr. .......................... 296/171 X |
| 5,634,683 | 6/1997 | Young ........................................ 296/165 |
| 5,902,001 | 5/1999 | Schneider ............................... 296/26.13 |

FOREIGN PATENT DOCUMENTS 599734  6/1960  Canada .................................. 296/171

Primary Examiner—D. Glenn Dayoan
Assistant Examiner—Chad D. Wells
Attorney, Agent, or Firm—Daniel O'Connor

[57] ABSTRACT

A slideout room operating system for use with a recreational vehicle or travel trailer.

A dual drive means, part of which supports the slideout room, is used to efficiently perform the moving function.

The design is economical to manufacture and install and provides improved reliability of operation for slideout room systems currently in use.

1 Claim, 1 Drawing Sheet

SLIDEOUT ROOM OPERATING SYSTEM

BACKGROUND AND OBJECTS OF THE INVENTION

The present invention is generally related to the travel trailer arts and, in particular, to an extendable room or area for such vehicles. Such designs in the prior art have been typically known as slideout or telescoping rooms.

Such slideout rooms or areas have become an important commercial part of the travel trailer arts and various patents have described efforts to arrive at a practical operating design which may be marketed on a widespread basis.

Accordingly, it is an object of the invention to set forth a novel slideout or telescoping room design which may be simply and readily manufactured.

It is a further object of the invention to demonstrate an extendable room design which is inexpensive and easily installed for widespread commercial appeal.

It is also an object of the invention to show a novel design with greatly improved reliability features to enhance use and life of the overall extendable room unit.

These and other objects and advantages of the present invention will be apparent to those of skill in the art from the description which follows.

PRIOR ART PATENTS AND DESIGNS

U.S. Pat. No. 5,634,683 shows a typical slideout room for a recreational vehicle with the room in an extended position in FIG. 2 and in a retracted position in FIG. 1. FIG. 3 of the patent shows an elongated chain drive which is used to turn five screws 30 which slide the room.

In contrast to the above patent, the present invention utilizes a dual drive system which has proven to be highly efficient in terms of manufacturing costs, installation, operation and maintenance.

SUMMARY OF THE INVENTION

A slideout room is supported by a pair of inner tubes which effectively serve to move the room to an extended or retracted position.

The inner tubes are arranged in slidable relation to a pair of outer tubes. Relatively short chain and sprocket drive means are used to drive the inner tubes.

The system utilizes a single drive motor and shaft to efficiently provide the desired motion.

The system is designed to be economical to manufacture and install for practical and efficient use in the art.

BRIEF DESCRIPTION OF THE DRAWING FIGURES

DESCRIPTION OF A PREFERRED EMBODIMENT

Figure 1:
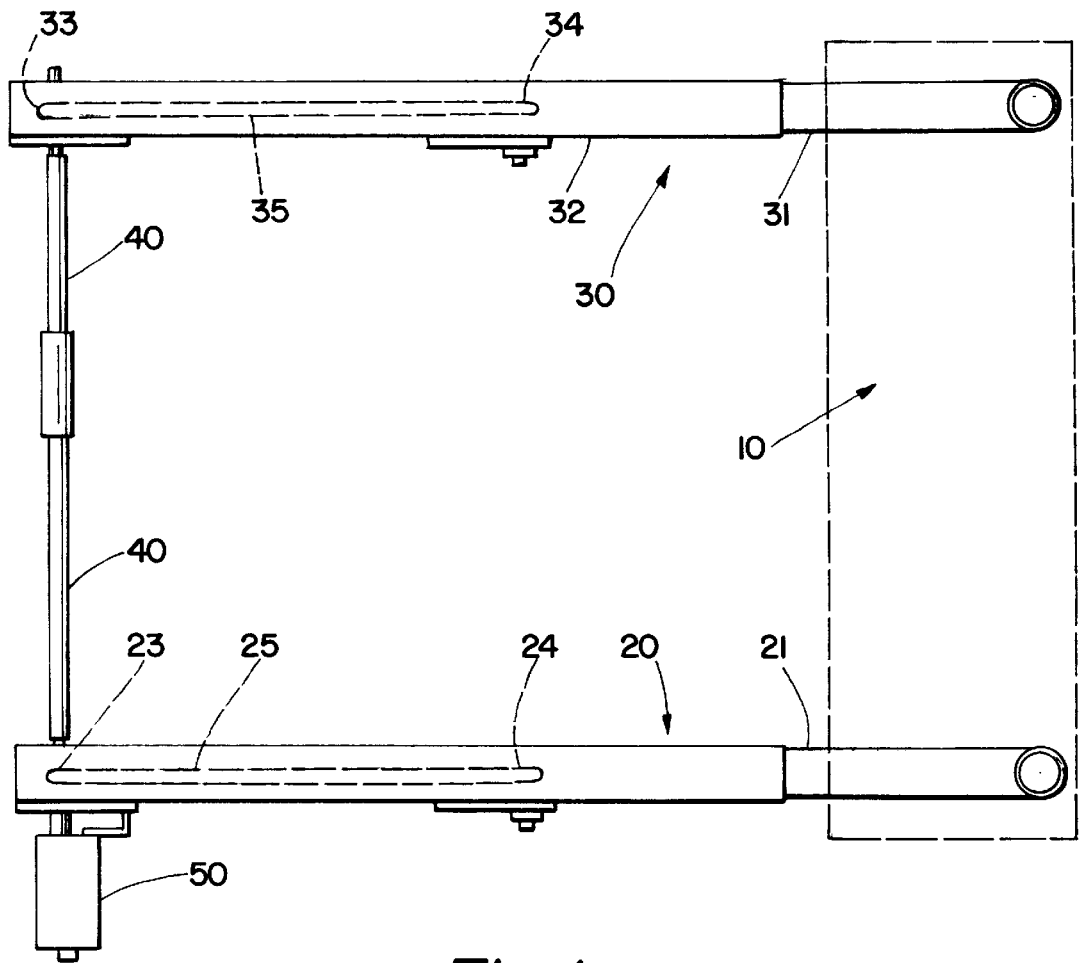
FIG. 1 is a top, schematic view of the system and illustrates the slideout room in relation to the sliding inner tubes, the outer tubes and the drive shaft and motor.

Referring to the drawings, FIG. 1 shows a slideout room 10 mounted on a pair of slidable tubes 21 and 31. As is known in the art, the slideout room 10 is designed to move from a retracted to an extended position and back as desired.

The ends of inner tubes 21 and 31 are positioned within outer tubes 22 and 32 respectively to provide an efficient sliding motion.

FIG. 1 further shows a drive shaft 40 and drive motor 50 which are used to turn a pair of front sprockets to be later described.

Figure 2:
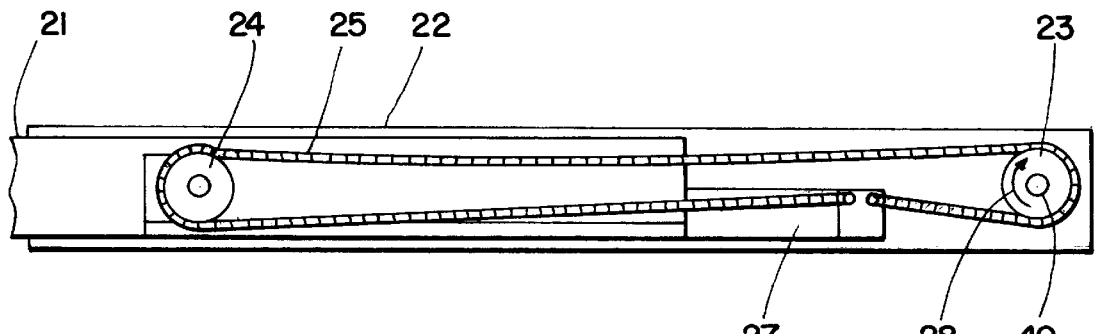
FIG. 2 is a side, schematic view and illustrates the chain and sprocket drive means in relation to the inner and outer tubes.

Each of the outer tubes 22 and 32 contains a sprocket and chain mechanism as shown in FIG. 2.

FIG. 2 shows the elements within outer tube 22 and it is to be understood that an identical system of chain and sprocket components is contained within the second outer tube 32.

As shown in FIG. 2, a front sprocket 23 is turned by the shaft 40.

A chain 25 is connected to the inner tube 21 at a chain holder-drive mechanism 27.

The chain 25 travels around the front sprocket 23 and a rear sprocket 24. Thus, rotating the front sprocket 23 via shaft 40 in a clockwise manner, as indicated by arrow 28, will have the effect of moving the inner tube 21 to an extended position. A counterclockwise rotation of front sprocket 23 will have the effect of moving the inner tube 21 to a retracted position.

In similar fashion, the second outer tube 32 has a chain 35 and front and rear sprockets as indicated by numerals 33 and 34 in FIG. 1.

The rear sprocket elements are actually inside the inner tubes. Each inner tube is slotted as shown in FIG. 2 for the for the respective sprocket shaft to pass through.

Such dual action drive mean has been found to be highly efficient mechanically in addition to being economical to manufacture and install.

The design is also highly reliable by reason of the relatively simple mechanical design.

While a particular embodiment has been shown and described, it is intended in this specification to cover all equivalent methods and structures which would reasonably occur to those of skill in the art.

The invention is further defined by the claims appended hereto.

I claim:

1. A drive means for extending and retracting a slideout room (10) of a recreational vehicle comprising:

a first inner tube means (21) for supporting said slideout room, said first inner tube means being in slidable relation to a first outer tube means (22), front and rear sprocket means (23,24) and chain drive means (25) within said outer tube for driving said inner tube (21) from a retracted to an extended position or from an extended to a retracted position, a second inner tube means (31) for further supporting said slideout room, a second outer tube means (32) for containing a front sprocket (33) and a rear sprocket (34) and a chain drive means (35), a shaft (40) extending between said respective front sprockets (23,33), motor drive means (50) for turning said shaft in a clockwise or counterclockwise direction.

* * * * *